March 14, 1933.     E. H. KUHLMAN     1,900,941
WELDING ELECTRODES
Filed Sept. 28, 1931
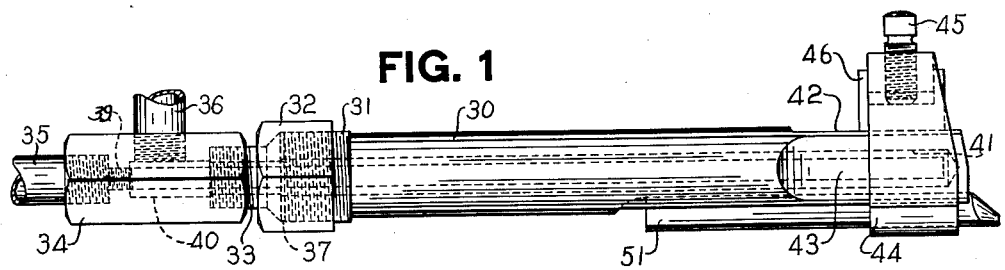
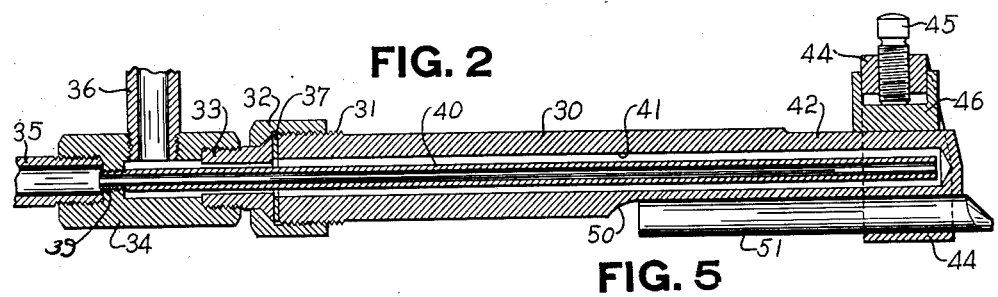
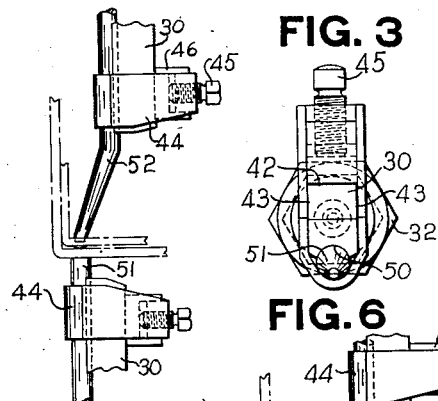
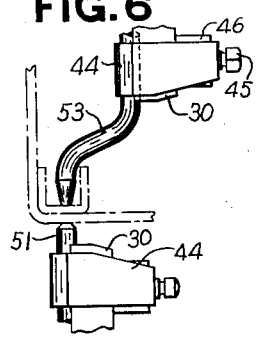
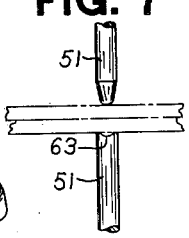
Inventor
Edward H. Kuhlman
By
Carl Beust
His Attorney Patented Mar. 14, 1933

1,900,941

UNITED STATES PATENT OFFICE

EDWARD H. KUHLMAN, OF DAYTON, OHIO

WELDING ELECTRODES

Application filed September 28, 1931. Serial No. 565,663.

This invention relates to electrodes for electric welding machines, and particularly to one having an adjustable and removable welding tip, and means for securing the welding tip thereto.

There are several known ways and means of securing electrode tips to the electrodes, among which are soldering (silver solder being the most commonly used) the tip to the end of the electrode; having the ends of the electrode tapped out to receive a screw portion on the electrode tip itself; and by tapering the tip shank and driving it into the electrode.

The electrodes are usually made of hard drawn copper, and the tips are many times made of what is known as "Elkaloy" and "Elkonite". Some tips are also made of copper.

Many of the tips now on the market which are screwed into the ends of the electrodes are rather expensive, in that they are more or less short lived, as they are hollowed out to permit the entrance of water for cooling, thus giving a comparatively small section of material which can be actually used. In use, the tips are subject to very intense heat, and require "dressing" several times a day.

Due to the particular shapes of some of the "Elkaloy" tips now on the market, they cannot be used in welding certain types of parts, such as small angle irons and channel bars.

It is, therefore, an object of the present invention to provide an electrode having means thereon to firmly secure thereto a welding tip, and at the same time permit the tip to be easily and quickly adjusted to suit various welding conditions, and also to enable the operator to more easily and quickly dress the welding tip after it has become worn from intense heat and pressure.

The adjustability of applicant's novel welding electrode is of considerable advantage to the operator when setting his electrodes for welding a new job. Since correct pressure is one of the important factors in obtaining a perfect weld, the ease with which applicant's welding tip may be adjusted materially aids the operator in obtaining the proper adjustment for the required pressure.

Applicant's electrode is so constructed as to materially aid in the cooling of the tips, thereby giving a longer life to the tips than heretofore.

While a round tip has been shown for the purposes of illustrating this invention, it is to be clearly understood that the invention is not limited to this particular shape or size shown, as the sizes and shapes can be varied without departing in any way whatsoever from the scope of this invention. For example, the welding tip may be square, half round, hexagon, or, in fact, any shape the manufacturer desires.

It is another object of the invention to provide a welding electrode having thereon a slidable clamping strap to securely fasten a welding tip to the electrode in any desired position.

It is another object of this invention to so construct a water cooled electrode that the adjustable welding tip will have the maximum amount of surface adjacent the water pocket in the electrode, thus maintaining the tip as cool as possible from the water in the electrode.

Another object of the present invention is to provide a welding electrode having a tip suitable for various types of welding, such as plain spot welding, projection welding, blister or pimple welding, etc.

With these and incidental objects in view, the invention includes certain novel features of construction and combinations of parts, the essential elements of which are set forth in appended claims and a preferred form or embodiment of which is hereinafter described with reference to the drawing which accompanies and forms a part of this specification.

Of said drawing:

Fig. 1 is a side view of an electrode having an adjustable tip.

Fig. 2 is a section taken through the center of the electrode, and shows how the adjustable tip is clamped in the recess of the electrode.

Fig. 3 is an end view of the electrode, tip and clamping device.

Fig. 4 shows a standard machine with a pair of electrodes in position for welding.

Fig. 5 illustrates, in reduced scale, a form of welding tip to accomplish "offset welding", which tip can be readily used in lieu of the straight tip shown in Figs. 1 to 4.

Fig. 6 shows, in reduced scale, a "gooseneck" tip, and one application of its work.

Fig. 7 illustrates how the tips are used when making "blister" or "pimple" welds.

Fig. 8 shows a "blister" or "pimple" weld before the blister is ground off.

Described in general terms, applicant's invention includes a welding electrode having secured thereto, by means of an adjustable clamp, a welding tip which is also adapted to be adjusted to various positions. The novel electrode is readily adaptable for use in standard types of welding machines now on the market, one type of which is shown in Fig. 4.

Each machine uses two electrodes, and since they are identical only one of them has been illustrated in detail. The welding tip may be used with the pointed end out as shown in Figs. 1 and 2, or with the blunt end out as shown in the lower electrode in Fig. 4.

The electrode includes a rod or bar 30 made of hard drawn copper or any other suitable metal, and having a threaded end 31 to receive a ring nut 32 carried on a union bottom 33. This bottom 33 is threaded into a coupling 34 having an intake pipe 35 and an outlet pipe 36 for a cooling fluid. The joint between the electrode and the union is made leak-proof by the use of a suitable washer 37. The electrode bar 30 may be made any size or shape suitable for the particular type of welding machine with which it is to be used.

The intake pipe 35 is in alignment with a tube 40 threaded at 39 in the coupling 34. This tube 40 extends into a bore 41 in the electrode 30. At one end the electrode 30 has a flat surface 42 and flattened sides 43 to receive a clamping strap 44. This strap is preferably made of nickel steel for strength and compactness, and carries a screw 45, the end of which is adapted to bear against a U shaped clamping block 46. The electrode bar 30 has a recess 50 shaped to receive a welding tip 51.

By loosening the screw 45 the block 46 becomes free between the surface 42 and the strap 44, thus loosening the welding tip 51 so that it may be adjusted to any desired position.

The electrodes 30 are carried by horns 55 and 56 of a welding machine 57, the top horn being movable downwardly upon depression of a foot pedal 58.

For cooling purposes water or any other cooling fluid is forced through a hose 59 into the intake pipe 35, from where it passes through the tube 40 into the bore 41, from which it passes to the outlet pipe 36 to a hose 60. The circulation of the cooling fluid continues from the hose 60 and enters the lower electrode through a hose 61, passing then through the lower electrode and escaping through the outlet pipe 36 to the outlet hose 62.

From the above description it will be perfectly clear that the welding tip may be readily adjusted to any position along the recess 50, so that as much, or as little of the tip as is desirable may extend beyond the end of the electrode bar 30.

It has been previously stated that the invention is not limited to the particular cylindrical shape of the welding tip as shown, and that any other shape, such as square, hexagon or half-round, may be used. In case a hexagon tip is used, the recess 50 and the strap 44 are formed so as to rigidly bind the tip and the electrode bar together to form a perfect and constant electrical contact between the electrode bar and the tip. This tight contact also insures the maximum cooling of the tip from the water or other fluid as it passes through the bore 41. It is to be noted that the recess 50 is comparatively deep, so as to leave only a thin wall between the bore 41 and the welding tip 51.

The flattened surface 42 on the electrode bar 30 may be omitted and the clamping block 46 curved to fit a circular contour of the bar if desired.

Also, it may be desirable to have the bars 30 of some other shape than cylindrical. A square or any other shaped bar may be used without departing from the invention. In case a square or any other multiple flat-sided bar is used, the recess 50 may be dispensed with, and the tip clamped to the side of the bar.

The electrode tips may be formed in various shapes, such as shown in Figs. 5 and 6, to suit different welding conditions. In Fig. 5 a tip 52 is used for what is known as offset welding, and Fig. 6 shows a so-called gooseneck tip 53 and one illustration of how such a tip can be used. Fig. 5 shows the "work", in dot and dash lines, being welded as two angle irons; and Fig. 6 shows the "work", in dot and dash lines, as a channel or U bar being welded to an angle iron.

It has been stated that applicant's invention is readily adaptable for spot welding, projection welding, and blister welding.

When making projection welds the tips in both electrodes are placed with the flat ends facing each other. In plain spot welding the tips are usually of a pointed nature facing each other.

For blister or pimple welding the top of the bottom electrode is cupped out, as at 63 (Fig. 7), so that when pressure is applied, after the parts have been sufficiently heated to a plastic state, the metal is forced into the cupped out portion in the top of the bottom electrode. Fig. 8 illustrates how the parts shown in Fig. 7 appear after welding. This type of welding is particularly desirable and adaptable when chromium plating the parts thus welded, because if there is the slightest trace of a ring at the point of welding, it will show very plainly after the chromium has been deposited on the metal and buffed.

With the blister weld, this blister or pimple 64 (Fig. 8) is ground off so as to make a perfectly smooth finish at the point of weld, thus leaving no trace of a ring or any depression caused by the fusing of metals at that point.

In projection welding, shown in Fig. 5, and particularly where screw plates or lugs are secured to cabinet parts, it is often necessary that such screw plates be located in the corners of angles, and by having the welding tip 51 adjustable longitudinally of the electrode bar, many welds can be made with applicant's device that could not be made heretofore.

The same is true with spot welding shown in Fig. 6.

Applicant's novel welding electrode, therefore, has a much wider range of adaptability than the electrodes formerly used, that is, by the use of this device offset welding can be accomplished by merely removing the straight tip (Figs. 1 and 2) and inserting an offset tip as shown in Fig. 5. Moreover, welding of the nature shown in Fig. 6 can be easily accomplished by applicant's adjustable electrode.

While the form of mechanism herein shown and described is admirably adapted to fulfill the objects primarily stated, it is to be understood that it is not intended to confine the invention to the one form or embodiment herein disclosed, for it is susceptible of embodiment in various forms all coming within the scope of the claims which follow.

What is claimed is:—

1. A welding electrode having an adjustable welding tip, and adjustable means for maintaining the tip in any desired position on the exterior surface of the electrode.

2. A welding electrode having a slidable welding tip, and means slidable longitudinally in relation to the electrode and tip for maintaining the tip in any position to which it is set.

3. A welding electrode having an external recess, a welding tip adapted to be firmly held in said recess, and means for clamping the tip to the electrode in any desired position in the recess.

4. An electric welding machine electrode having a bore to receive a cooling fluid; and a recess arranged substantially parallel to the bore; a welding tip located in said recess; and means including a clamping strap, a clamping block, and screw for rigidly holding the welding tip in place relative to the cooling bore.

5. An electrode having a bore running longitudinally thereof to receive a cooling fluid, a recess arranged parallel to the bore, and a flattened surface substantially opposite the recess; a welding tip in the recess; a clamping block in contact with the surface opposite the recess; and a clamping strap rigidly binding the welding tip and the clamping block to the electrode to prevent any movement of the tip relative to the electrode.

6. An electrode having a plurality of flattened surfaces, and a recess adjacent one end thereof; a welding tip located in the recess; a clamping member resting on one of the flattened surfaces of the electrode; a clamping strap adapted to fit over the remaining flat surfaces of the electrode and over the welding tip; and means carried by the strap and adapted to press the clamping member and the tip against the electrode to rigidly secure the tip to the electrode in any desired position.

7. The combination of a welding tip; an electrode having an external recess to receive said tip; and means to secure the tip in the recess in any desired position.

8. The combination of a welding tip; a clamping device associated with said tip; and an electrode formed with an external recess to receive said tip, said recess and tip formed to prevent rotational movement of said device.

9. The combination of a welding tip; an electrode formed with an external recess to receive welding tips of various forms; means adjustable on the electrode to hold the tip in any desired position; and means to lock the adjustable means to the electrode in any position of adjustment.

In testimony whereof I affix my signature.

EDWARD H. KUHLMAN.